March 29, 1927.
A. BERNSTEIN
DISPLAY APPARATUS
Filed Sept. 6, 1923
1,622,409
2 Sheets-Sheet 1
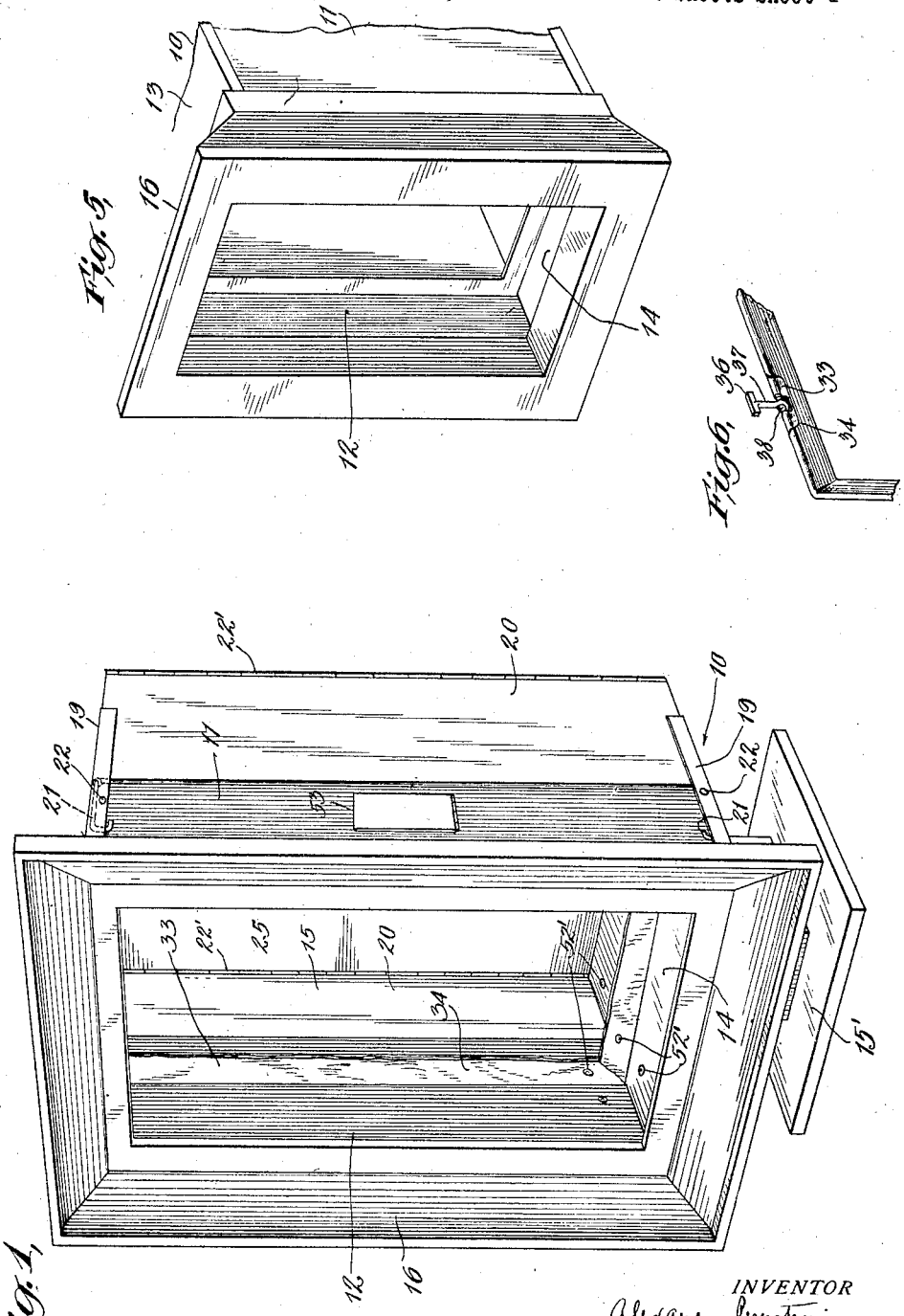

March 29, 1927.
A. BERNSTEIN
DISPLAY APPARATUS
Filed Sept. 6, 1923
1,622,409
2 Sheets-Sheet 2
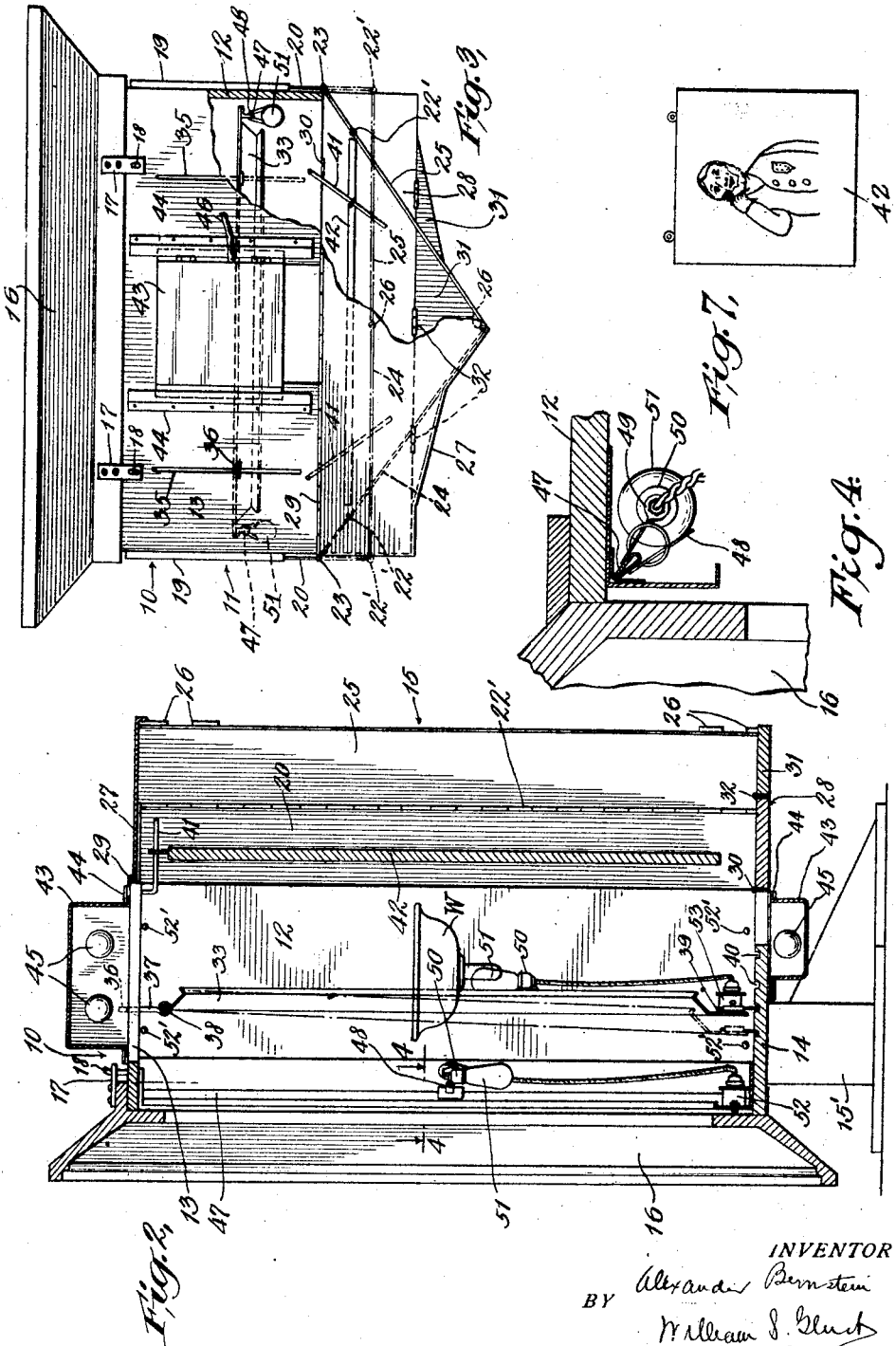
INVENTOR
Alexander Bernstein
BY
William J. Gluck
ATTORNEY Patented Mar. 29, 1927.

1,622,409

UNITED STATES PATENT OFFICE.

ALEXANDER BERNSTEIN, OF NEW YORK, N. Y., ASSIGNOR TO WILLIAM S. GLUCK, OF NEW YORK, N. Y.

DISPLAY APPARATUS.

Application filed September 6, 1923. Serial No. 661,208.

My present invention relates generally to displays and more particularly to an arrangement of the display apparatus whereby not only is the most effective display attained but also the display itself may be varied from time to time by a change in part thereof.

Displays are frequently if not generally of what might be termed the picture type, i. e., it comprises generally a picture frame within which is arrayed the display itself, which is in the form of a picture held in a fixedly predetermined position relatively to the frame and generally immediately there behind. Where on the other hand depth is required or what might be termed third dimensional effect, the shadow box is frequently employed. This shadow box however is open to the defect that while it may to some extent increase the effect, it nevertheless is nothing more than a picture frame in which the picture displayed is positioned at a substantial distance in back of the front frame.

In the accompanying specification and drawings, I have illustrated and described my invention as associated with and embodied in a box like construction, in connection with which are employed a plurality of frames, to set off the display in a predetermined manner and lighting arrangements to give to the associated parts a lightened and accentuated effect.

Specifically it is one of the objects of the present invention to provide a box of this character to which may be interchangeably and detachably secured any one of a plurality of frames, the frames having the shape, size or color suitable to the subject displayed within the box.

It is another specific object of the invention to provide the box with means for supporting one or more masks in adjustable relationship with the box.

It is a still further object to provide within the box means for securing drapes, as may be desired to properly treat and dress the subject displayed within the box. Still another and further object of the invention is to provide adjustable lights within the box, in part supported by the box, and in part by the mask or masks.

Another object of the present invention is to provide a box for effectively displaying objects which can be varied in depth at will.

Another object is to provide a box to advantageously occupy the space when used in a corner of a room or window.

Among other objects of my invention are the provision of a display apparatus which includes the employment of a plurality of frames one of which serves as such for the remaining construction; the provision of a display apparatus which includes the employment of a plurality of specially arrayed frames for a single display; the provision of a display apparatus which includes the employment of a plurality of variably positioned frames for one display; the provision of a display apparatus which includes the employment of a plurality of relatively adjustable frames for one display; the provision of a display apparatus which includes the employment of a plurality of frames associated together for angular variation and to serve as a single display; the provision of a display apparatus employing a plurality of frames associated together for rectilinear and angular variation; and the provision generally of a new association of frames, lighting effect and display apparatus.

For the attainment of these objects and such other objects as may hereinafter appear or be pointed out, I have illustrated one embodiment of my invention in the drawings wherein Fig. 1 represents a perspective view of my apparatus;

Fig. 2 a vertical section therethrough;

Fig. 3 a top plan view partly broken away;

Fig. 4 a section on line 4—4 of Figure 2;

Fig. 5 is a view of the apparatus with the main frame changed; and

Fig. 6 is a detail.

Fig. 7 is a face view of the background, illustrating a pictorialization depicted thereon.

Now referring to the parts more in detail, 10 indicates a box generally rectangular in shape. The box comprises in general two side walls 11 and 12, a top 13, a bottom 14, and a rear wall 15. The box may be resting if so desired on a pedestal 15' of any convenient form or shape. Readily detachably secured to the front of the box is a frame 16, having secured to its upper portion a pair of lugs 17, each having an eye adapted to engage a hook 18, mounted on the top of the box 10. These lugs and eyes are provided so that the frame 16 may be removed and another of a different character substituted for it when it is desired to have the frame harmonize with the subject displayed within the box.

The walls 11 and 12 are extensible in width, and for provision of this, each of the walls 11 and 12 is provided with a pair of rails 19, within which are adapted to slide the extensible portions 20 of the walls 11 and 12, the portions 20 being provided with the bent hooks 21, cooperating with stop studs 22 threaded through the rails 19 to limit the outer movement of the extensible portions. These extensible portions have pivotally secured to their rear portions, as by means of the hinges 22, the back 15 already referred to, the front portions being themselves pivotally secured to the hooks 20 as shown at the points 23. Thus, if desired the extensions 20 may lie either parallel to the walls 11 and 12 or may be inclined toward one another, as will be apparent by an inspection of Fig. 3. The back 15 comprises two doors 24 and 25 adapted to close the rear either as shown by the solid lines in Fig. 3 or by the dotted lines in the same figure, the doors being kept closed in adjusted position by any suitable means as, for example, by passing a rod down through the hinged ends 26 of the doors. In order to accommodate the back in any of its positions, the top and bottom walls 13 and 14 are each provided with hinged extensions 27 and 28, the top extension being hinged by the hinges 29 while the lower extension is hinged to the bottom by the hinges 30, the lower extension being itself provided with a second hinged portion 31 hinged at the point 32, these extensible portions being provided so as to enable the box to accommodate itself either broadside or within a window or to stand diagonally of the walls of the window. When in the latter position the side walls and back may be extended as well as the top and bottom so as to utilize the space that would otherwise be wasted.

Within the box is slidably mounted one or more masks 33 suitably covered, as, for example, with black velvet 34, said masks themselves being in the shape of a frame. This mask may be supported in any convenient manner by the top of the box, but I have preferably mounted the same to slide in slots 35 in and through the top 13 of the box, the mask being provided with T irons 36 resting on top of the box and having a shank 37 extending through the slot and loosely encircling the top rod 38 of the mask. The velvet is suitably cut away at the point of securement of the T iron to the mask so as to readily permit the T iron to slide along the mask rod where the mask is tilted angularly within the box. It will be understood that this method of securing the mask within the box enables it to be moved to any position within the same and also to be tilted about a vertical axis. In order to tilt the mask about a horizontal axis, a spring latch 39 is secured to the bottom of the mask in the rear side thereof, the same cooperating with a series of holes 40 in the bottom of the box.

Also mounted in the top of the box is a pair of rods 41 which may be swung about as desired to accommodate an article to be supported thereby as for example a picture 42.

In order to properly illuminate the objects within the box, adjustable lighting means are provided. These comprise in general parts shiftably mounted on the box proper and lamps detachably and adjustably secured within the box in the rear of the frame and in the rear of the mask or masks. The former namely the parts comprise boxes 43 slidably mounted in runways 44 mounted on the top and bottom walls of the box, these boxes carrying lamps 45 furnished with electricity through the medium of suitable conductors 46, the top and bottom walls being suitably recessed so as to permit the light to shine into the box. Other lamps are suitably secured to runways 47 secured to the box adjacent to the front portion thereof and to the rear of the mask 33, by means of clip fasteners 48, one of whose wings 49 being secured to a lamp socket 50 within which is mounted the incandescent lamp 51. The box may at suitable positions have outlet boxes 52 and similar outlet boxes 53 may be carried by the mask, these outlet boxes providing facilities for the attachment of one or more of the lamps.

Suitably positioned within the box and on the masks are the female portions of snap fasteners 52', these being placed therein so that drapes (not shown) having the corresponding male portions of the fasteners may be interchangeably secured within the box.

The box is also provided in the side wall 11 with a hinged door 53 to provide ventilation when the box is turned on its side.

In use, the box may be used as a means for displaying a plain picture hung on the hooks 41. In this instance the box acts as a shadow box and the mask 33 serves to increase the sense of depth of the picture. If so desired the picture may be mounted directly behind and attached to the mask 33, and the mask may be tilted vertically or horizontally as desired to obtain the best lighting effects for the picture.

But the most important use to which the box may be put is in displaying objects having depth as well as width and height.

For example, as shown in Figure 7 if the background 42 be painted to represent a man shaving and the mask support a bowl W, see Figure 2, with the lighting arrangement within the box properly adjusted the effect within the box is startlingly realistic.

The box may at different positions support cutouts in color which when properly lit up look very realistic.

Also an invisible net may be stretched across the mask and objects placed both before and behind the same. Then when the lights behind the mask are not lit only the foreground objects are seen, that is, any objects which may be supported by the net and the objects in front thereof. When the lights behind the net are lit, the net is practically invisible but the combination and association of objects is very materially changed.

These are only a few of the many uses to which the invention may be put and applicant does not wish to limit himself to these uses.

Having described my invention, what I claim and desire to secure by Letters Patent is:

1. In a device of the character described, in combination, a display box, a mask, means for supporting the mask interiorly of the box for adjustment longitudinally thereof, the box being constructed and adapted to receive an object or pictorialization therewithin observable through the mask whereby an adjustment of the mask will produce the illusion of a positional change in the relationship of the object or pictorialization with reference to the complete device.

2. In a device of the character described, in combination, a display box, a mask, means for supporting the mask interiorly of the box for adjustment angularly thereof, the box being constructed and adapted to receive an object or pictorialization therewithin observable through the mask whereby an adjustment of the mask will produce the illusion of a positional change in the relationship of the object or pictorialization with reference to the complete device.

3. In a device of the character described, in combination, a display box, a mask, means for supporting the mask interiorly of the box for adjustment longitudinally and angularly thereof, the box being constructed and adapted to receive an object or pictorialization therewithin observable through the mask whereby an adjustment of the mask will produce the illusion of a positional change in the relationship of the object or pictorialization with reference to the complete device.

4. A display box comprising top, bottom, and rear walls and extensible side walls; and hinged sections on the top, bottom, and extensible side walls forming connection between said top, bottom, and side walls with the rear wall when the box is in extended position.

5. A display box provided with extensible side walls, said walls having hinged sections, and angular top and bottom walls provided with hinged sections, one of said sections on each of said top and bottom walls being substantially triangular in configuration, hinge sections forming the connection between extension of the side walls and the rear wall.

6. A display box comprising an open-ended box, a frame detachably secured to the open end of said box, means for adjustably supporting a mask in said box and adjustable supports mounted in the top of said box to support an object.

7. A display box comprising an open-ended box, a frame detachably secured to the open end of said box, means for adjustably supporting a mask in said box, and illuminating means mounted on said box, said means being adjustable forwardly and rearwardly of the box.

In witness whereof, I have hereunder signed my name this 30th day of August, 1923.

ALEXANDER BERNSTEIN.